United States Patent [19]

Shapiro

[11] 3,728,715

[45] Apr. 17, 1973

[54] DIGITAL SUN SENSOR HAVING SUB-IMAGE RESOLUTION

[75] Inventor: William A. Shapiro, Hackensack, N.J.

[73] Assignee: The Bendix Corporation, Teterboro, N.J.

[22] Filed: Apr. 20, 1970

[21] Appl. No.: 29,819

[52] U.S. Cl. ................................340/347 P, 250/237

[51] Int. Cl. ................................................G08c 9/06

[58] Field of Search .......................340/347; 250/237, 250/203; 33/61, 62

[56] References Cited

UNITED STATES PATENTS

| | | | |
|---|---|---|---|
| 2,994,863 | 8/1961 | Trapnell, Jr. | 340/347 |
| 3,205,361 | 9/1965 | Albus | 250/237 X |
| 3,487,400 | 12/1969 | Ludewig, Jr. et al. | 340/347 |
| 2,793,807 | 5/1957 | Yaeger | 340/347 X |
| 3,216,004 | 11/1965 | Herriott | 340/347 |
| 3,440,426 | 4/1969 | Bush | 250/237 X |

*Primary Examiner*—Maynard R. Wilbur
*Assistant Examiner*—Charles D. Miller
*Attorney*—Peter C. Van Der Sluys and Plante, Arens, Hartz, Smith and Thompson

[57] ABSTRACT

A sun sensor having an aperture for receiving sunlight and forming an image of the aperture on an encoder mask, the position of the image corresponding to the angle of the sun relative to the sensor. The mask has a plurality of tracks having alternate opaque and clear segments for passing sunlight to associated photo cells which provide in response thereto a coded digital output corresponding to the image position and having sub-image resolution, that is, resolution smaller than the image. Circuit means combines certain bits of the coded output to provide a Gray Code output having the minimum number of bits required for the desired resolution and maximum angle measurement.

28 Claims, 6 Drawing Figures

INVENTOR.
WILLIAM A SHAPIRO
BY
Peter C. Van Der Sluys

INVENTOR.
WILLIAM A. SHAPIRO
BY Peter C. Van Der Sluys
AGENT

INVENTOR.
WILLIAM A. SHAPIRO
BY Peter C. Van Der Slays
AGENT

INVENTOR.
WILLIAM A. SHAPIRO
BY Peter C. Van Der Sluys
AGENT

INVENTOR.
WILLIAM A. SHAPIRO
BY
Peter C. Van Der Sluys
AGENT

DIGITAL SUN SENSOR HAVING SUB-IMAGE RESOLUTION

BACKGROUND OF THE INVENTION

1. Field of the Invention

This invention relates to sun sensors and more particularly to digital sun sensors having sub-image resolution.

2. Description of the Prior Art

Heretofore, digital sun sensors have utilized an aperture in the form of a slit to receive sunlight and to form an image of the slit on an encoder mask. The position of the image on the mask corresponded to the angle of the sun relative to the sensor and the image moved along the mask as the sun angle changed. The mask had a plurality of tracks each having alternate clear and opaque segments for passing or blocking the sunlight from associated photo cells positioned behind each track. The photo cells had outputs providing bits for a digital output corresponding to the angle of the sun relative to the sensor.

When a binary coded mask was used several bits would change at one time as the slit image moved along the tracks. Misalignment of the tracks caused certain bits to change before others and resulted in ambiguous outputs. Sophisticated mask and photo cell arrangements were required to prevent these ambiguities. These arrangements resulted in a more complicated encoder having reduced reliability, larger size and higher cost. In an effort to eliminate the ambiguity without unduly complicating the encoder the reflected binary code, or what is commonly called the Gray Code, was invented and masks were constructed to provide a Gray Code output. U.S. Pat. No. 2,632,058 describes the purpose and use of the Gray Code. The outstanding characteristic of this type of code was that only one bit at a time changed thereby eliminating the possibility of an ambiguous output resulting from misaligned tracks on the mask.

When the Gray Code was utilized the encoder resolution was limited by the size of the image because of code and mask pattern restrictions. Referring to FIG. 1 there is shown a portion of a typical mask arrangement for use with a one degree wide slit image to provide a Gray Code output. The dark segments are clear or transparent to pass sunlight to photo cells. The mask of FIG. 1 provides one degree resolution and finer resolution cannot be achieved by refinement of the mask pattern because the sun image would then subtend two successive transparent segments of the track associated with the least significant bit of the digital output, resulting in a continuous output and limiting the resolution of the sensor to the next most significant bit.

In an effort to increase resolution in recently designed encoders the Gray Code was abandoned and the mask replaced by mutually offset binary coded masks in conjunction with electronic circuitry to obtain fine resolution. One such device measured a course sun angle using a binary coded mask and a V brush logic scheme to prevent ambiguities. A fine sun angle was then measured using four mask patterns, arranged in space phase quadrature, in conjunction with interpolating circuitry comprising transistor choppers, summing amplifiers, filters, oscillators gates and a binary counter. Thus the prior art devices provided fine resolution at the expense of increased encoder complexity.

SUMMARY OF THE INVENTION

The present invention contemplates a digital sun sensor for providing a Gray Code output having sub-image resolution. The sensor has a rectangular aperture for receiving sunlight and forming an image of the aperture on an encoder mask. As the sun angle changes the image moves defining a path on the encoder mask. The mask has several parallel tracks extending the length of the path. Each track has alternate clear and opaque segments for passing or blocking the sunlight from an associated photo cell mounted behind the mask. The photo cells in response to the sunlight provide signals which form the bits of a digital output corresponding to the angle of the sun relative to the sensor.

The encoder mask is designed for providing a code so that ambiguities will not result from slight misalignment of the tracks. Use of this type of code eliminates the requirement for a complex arrangement of photo cell detectors and complicated circuitry. The unique mask pattern provided by the present invention allows for resolutions of less than one image size while having the advantages of the Gray Code.

Certain bits of the coded digital output are combined to reduce the total number of bits and to provide a true Gray Code output which is compatible with presently used decoding equipment designed for the Gray Code.

One object of the invention is to provide a simplified sun sensor having sub-image resolution.

Another object of the invention is to provide a sun sensor having a Gray Code output with sub-image resolution.

The foregoing and other objects and advantages of the invention will appear more fully hereinafter from a consideration of the detailed description which follows taken together with the accompanying drawings wherein three embodiments of the invention are illustrated by way of example. It is expressly understood however that the drawings are for illustration purposes only and are not to be construed as defining the limits of the invention.

DESCRIPTION OF THE INVENTION

The present invention provides a digital solar aspect sensor or what is more commonly called a sun sensor. The sensor provides a digital output corresponding to the angle of the sun relative to the sensor and having sub-image resolution.

The width of an image formed by the aperture of a sun sensor is always equal to or greater than the angle subtended at the sensor by the sun. This angle is approximately one half degree near the earth. The width of the image is dependent upon the aperture width, aberrations of any optics used in the sensor and the angle subtended by the sun. For ease of discussion it will be assumed that the aperture image has a unit width K.

Figure 2:
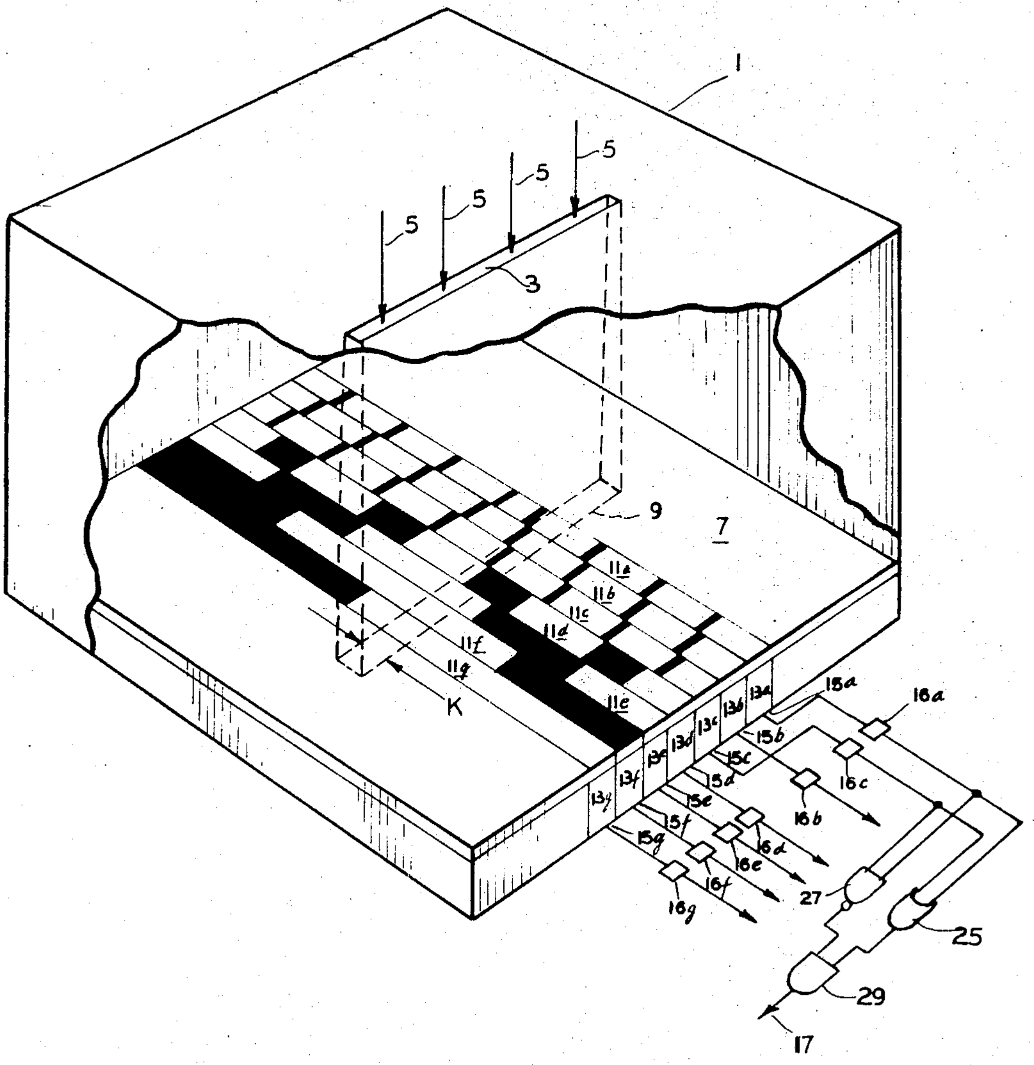
FIG. 2 is a cutaway isometric view of a sun sensor constructed in accordance with the present invention.

Referring to FIG. 2 there is shown a sun sensor 1 constructed in accordance with the present invention and having a resolution of K/4. Sensor 1 has an aperture in the form of a slit 3 for receiving and passing rays of sunlight 5 to an encoder mask 7 to form an image 9 in the form of a band of illumination having a width K and extending across the mask. The position of image 9 on mask 7 corresponds to the angle of the sun relative to sensor 1. As the angle changes image 9 moves lengthwise of the mask 7.

Encoder mask 7 has formed thereon parallel tracks 11a to 11g extending lengthwise of the mask. Each track has alternate opaque and clear segments for blocking or passing sunlight from corresponding photo cells 13*a* to 13*g* positioned beneath the tracks. Photo cells 13*a* to 13*g* have outputs 15*a* to 15*g* each providing a signal corresponding to the intensity of the sunlight received as determined by the segments. Threshold triggers 16*a* to 16*g* are connected to outputs 15*a* to 15*g*, respectively, and receive the signals therefrom to provide zero or one level signals. When a photo cell is irradiated with sunlight of sufficient intensity the corresponding trigger provides a one level signal and when the sunlight is blocked therefrom or is of insufficient intensity the trigger provides a zero level signal. The signals from triggers 16*a* to 16*f* provide the bits of a coded digital output corresponding to the position of the image 9 on mask 7. The digital code prevents ambiguities in the digital output. Trigger 16*g* provides a one level signal for negative sun angles and a zero level signal for positive sun angles. Trigger 16*a* is connected to an input of an OR gate 25 and to an output of a NAND gate 27. Trigger 16c is connected to a second input of OR gate 25 and a second input of NAND gate 27. The outputs of OR gate 25 and NAND gate 27 are connected to inputs of an AND gate 29 which has an output 17. Output 17 provides a zero signal when both triggers 16a and 16c provide like signals. Output 17 provides a one level signal when triggers 16*a* and 16*c* provide different signals.

Thus gates 25, 27 and 29 function to add the one level signals modulo unity from triggers 16*a* and 16*c* and provides a zero level signal on output 17 if there are zero or an even number of one level signals from triggers 16*a* and 16*c* and a one level if there are an odd number of one level signals from triggers 16*a* and 16*c*. The signals provided by output 17 and triggers 16*b*, 16*d*, 16*e* and 16*f* respectively provide the least to the most significant bits of a true Gray Code digital output corresponding to the sun angle relative to the sun sensor. The least significant bit of the digital output corresponds to an angle K/4 thus providing finer resolution than was heretofore available.

Figure 1:
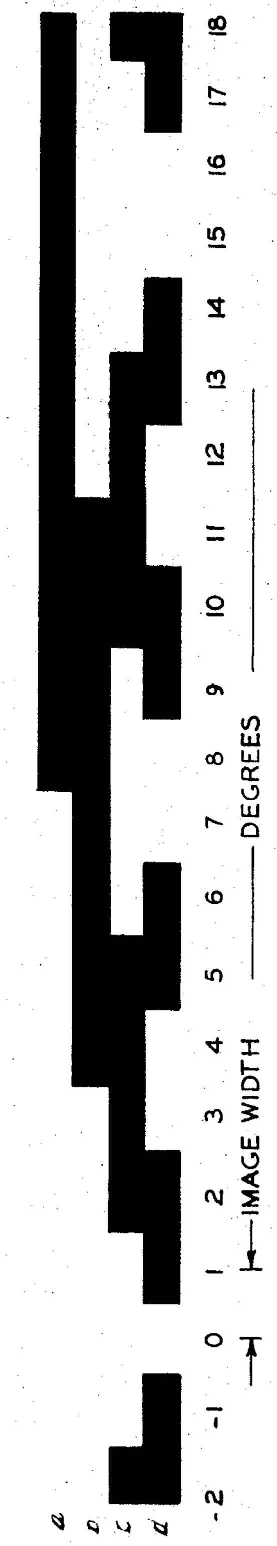
FIG. 1 is a plan view of a portion of a typical encoder mask used heretofore for providing a Gray Code output.
Figure 3:
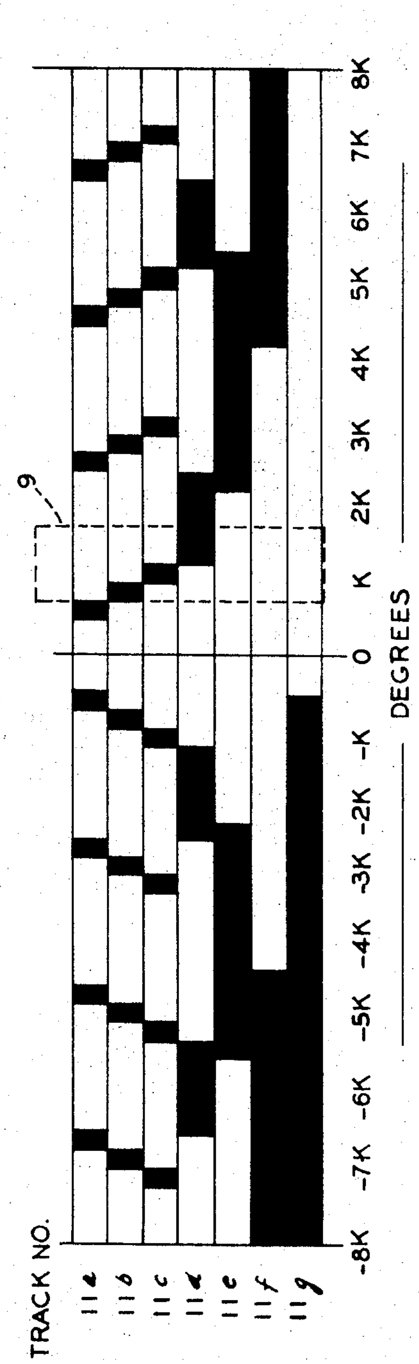
FIG. 3 is a plan view of the encoder mask used in the embodiment of the invention shown in FIG. 2.

Referring to FIG. 3, encoder mask 7 is shown enlarged and is symmetrical about a zero degree position except for track 11*g*. In the Figure the darkened portions are the clear segments of the tracks. Track 11*g* has a clear segment starting at an angular position of −K/2 and continuing therefrom to −8K at the end of the mask and the remainder of the track is opaque. Thus when image 9, which has an angular width K, moves to the negative side of the zero degree position photo cell 13*g* is irradiated with sunlight passing through the clear segment of track 11*g* and in response thereto trigger 16*g* provides a one level signal to indicate a negative sun angle. When the image moves to a positive angle the opaque portion of the track blocks the sun from the photo cell so that trigger 16*g* provides a zero level signal.

Tracks 11a to 11f are symmetrical about the zero angle position. Tracks 11*a*, 11*b* and 11*c* are interpolating tracks having clear segments each having a length K/4 that repeat at 2 K intervals with opaque segments in between. The first clear segments on either side of the zero degree position of track 11a start at the ± K/2 positions. The first clear segments of track 11b on either side of the zero degree position start at the ± 3K/4 positions. In like manner the first clear segments of track 11c start at the ± K positions. Tracks 11d, 11e and 11f are unit distance coded tracks having clear segments and the remainder being opaque. Track 11d has clear segments each having a length 5K,/4, the first clear segments starting at the ± 5K/4 positions and the clear segments repeating at 4K intervals thereafter. Track 11e has two clear segments starting at the ± 9K/4 positions and ending at the ± 22K/4 positions. Track 11f has two clear segments starting at the ± 17K/4 positions and continuing to the ends of the track.

Figure 4:
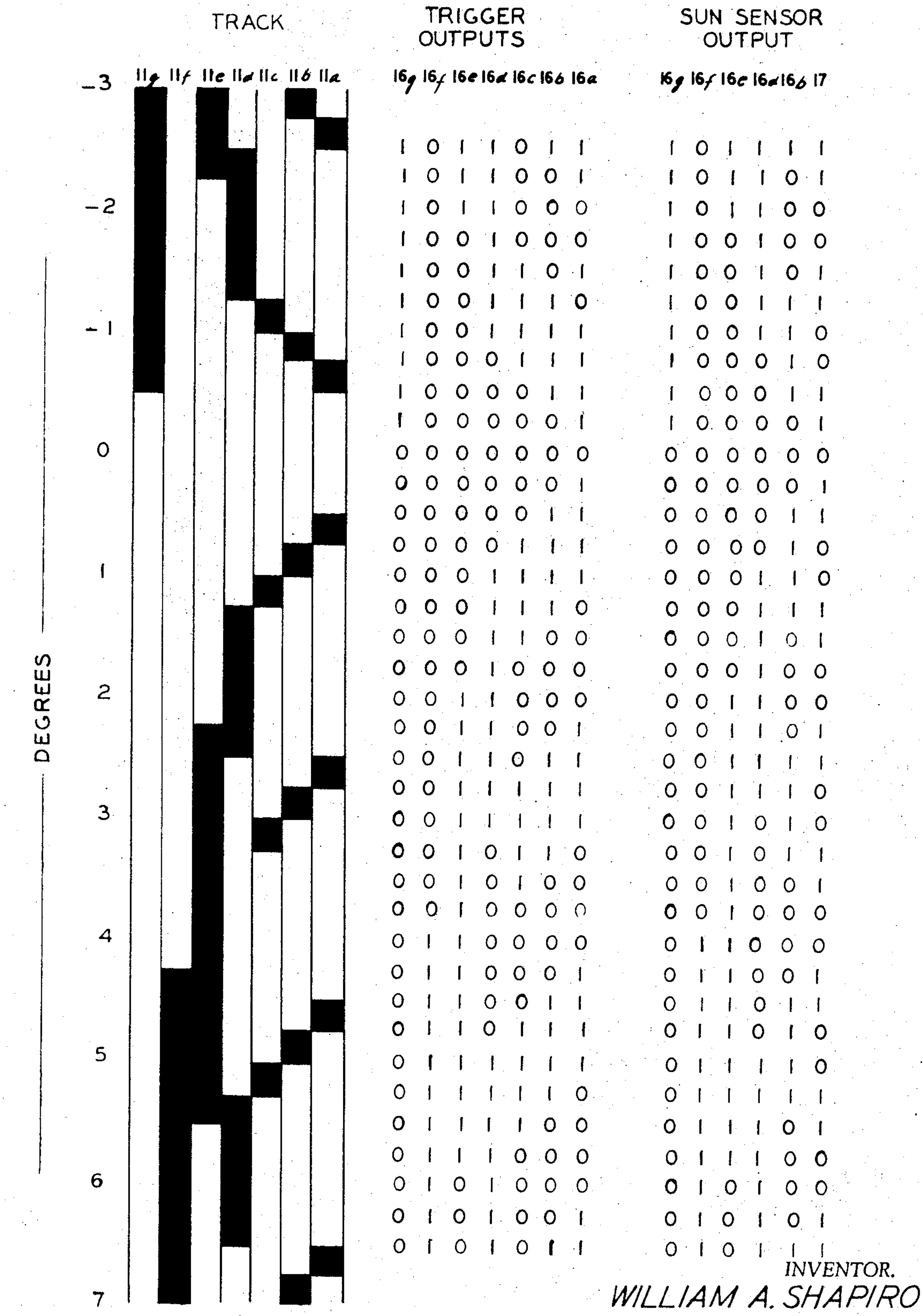
FIG. 4 is a table showing the outputs of the photo cells and the Gray Code output of the embodiment shown in FIG. 2 for the various positions of sun angle.

Referring to FIG. 4 there is shown an enlarged portion of encoder mask 7 and the corresponding trigger signal for every K/4 position of the aperture image. Triggers, 16*d*, 16*e*, and 16*f* provide a Gray Coded digital output corresponding to the sun angle and having a resolution of K. Triggers 16*a*, 16*b* and 16*c* provide interpolating bits that are unit distance coded and have resolution of K/4; however, the interpolating bits are redundant and excessive since only two integers are required to provide K/4 resolution. Therefore, the signals from triggers 16*a*, and 16*c* are combined by gates 25, 27 and 29 to provide a signal at output 17. Output 17 and trigger 16*b* provide two interpolating bits necessary for K/4 resolution. The signals from output 17 and triggers 16*b*, 16*d*, 16*e* and 16*f* provide a true Gray Coded output having a K/4 resolution as shown in the right hand columns of FIG. 4.

The invention is not limited to K/4 resolution, any sub-image resolution may be provided by using the required numbers of interpolating tracks and unit distance coded tracks. A resolution of K/*n* may be provided by using *n*−1 interpolating tracks, where *n* is any whole number. Each interpolating track is symmetrical about the zero angle position and has clear segments that repeat at 2K intervals and have a length of K/*n*. The track associated with the least significant bit has clear segments starting at the ± K/2 positions. The remaining interpolating tracks are positioned so that the clear segments start at positions displaced by K/*n* from the starting positions of the clear segments of the track associated with the next lower significant bit in a direction of increasing positive or negative angular position. A maximum angle of $2^m$ may be measured, where m is the number of the coded track associated with the most significant bit when the coded tracks are numbered from the least to the most significant. Each coded track m is symmetrical about a zero angle position and has clear segments that repeat at $(2^{m+1})$ K intervals and have a length equal to $(2^{m-1}+1/n)$ K. Each track has first clear segments on each side of the zero degree position that start at the $\pm(2^{m-1}+1/n)$ K positions. A sensor using a mask designed in accordance with the above requirements does not necessarily provide a Gray Coded output;

A true Gray Code is provided only when the resolution is (K/2)n where n is any whole number. Intermediate resolutions do not provide a true Gray Code output because all the available Gray Code integers are not utilized.

A Gray Code output having a resolution of (K/2)n may be provided by using $2^n-1$ interpolating tracks that are symmetrical about the zero angle position. Each of the interpolating tracks have clear segments that repeat at 2K intervals and have a length (K/2)n. The track providing the least significant bit has clear segments starting at the $\pm$ K/2 positions. The remaining interpolating tracks are positioned so that the clear segments start at positions displaced (K/2)n from the starting positions of the clear segments of the track associated with the next lower significant bit in a direction of increasing positive or negative angular position.

Angles up to $2^m$ may be measured where $m$ is the number of the coded track associated with the most significant bit when the coded tracks are numbered from the least to the most significant. Each track $m$ has clear segments having a length $(2^{m-1}+1/2n)$ K that repeat at $(2^{m+1})$ K intervals, the first clear segments starting at the $\pm[2^{m-1}+(1/n)]$ K positions.

To provide a true Gray Code output the output signals from the triggers associated with the interpolating tracks must be combined to provide Gray Coded interpolating bits. Assigning p as the number of a Gray Coded interpolating bit counting from the least to the most significant bit, bit number p is determined by combining the unit distance coded interpolating bits numbers $2^{p-1}$ and multiples thereof excluding bits that are multiples of $2^p$. The bits are combined by circuit means which adds the one level signals in the bits to be combined and provides a zero level signal if the sum is zero or even and a one level signal if the sum is odd.

The circuit means used to combine the bits comprises a plurality of circuits similar to the one shown in FIG. 2. The first two bits to be combined are supplied to the inputs of a first circuit as were the signals from triggers 16*a* and 16*c*, the output of which is supplied to one input of a second circuit and the third bit is supplied to the other input of the second circuit the output of which is supplied to a third circuit along the fourth bit to be combined. In like manner any number of bits may be combined by using the required numbers of circuits.

Thus a sun sensor may be designed using the above described invention to measure any desired angle up to a maximum of 180°, or $\pm$ 90°, and to any desired resolution.

Figure 5:
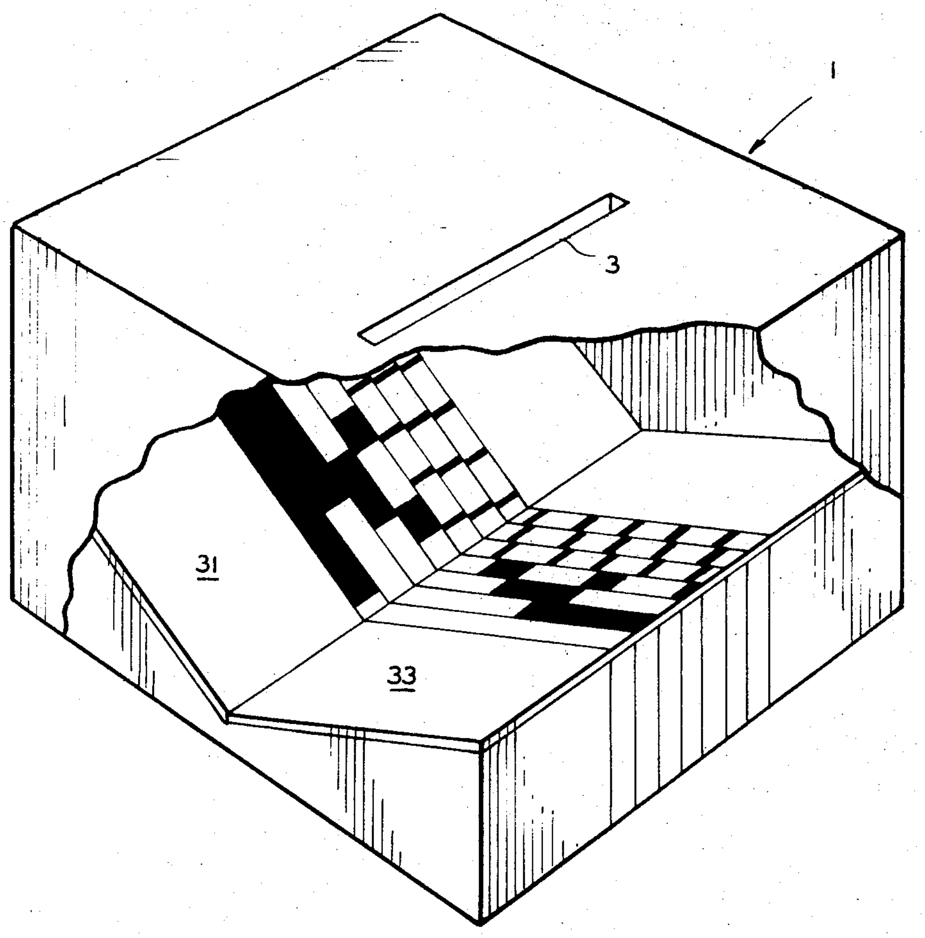
FIG. 5 is a cutaway isometric view of another embodiment of the present invention.

As the maximum measurable angle is increased various errors are introduced that must be compensated for. Angles up to $\pm$ 8° may be measured using the embodiment shown in FIG. 2 without introducing any significant error. As the angle increases beyond $\pm$ 8° the image motion becomes non-linear with change in sun angle. Angles up to $\pm$ 16° may be accurately measured if the encoder mask is divided into two planes as shown in FIG. 5. Planes 31 and 33 intersect along the zero angle position and each plane slopes upward therefrom on an angle such that the planes are perpendicular to a line drawn from the $\pm$ 8° positions to the aperture. By modifying the mask in this manner the nonlinearity errors are minimized.

Figure 6:
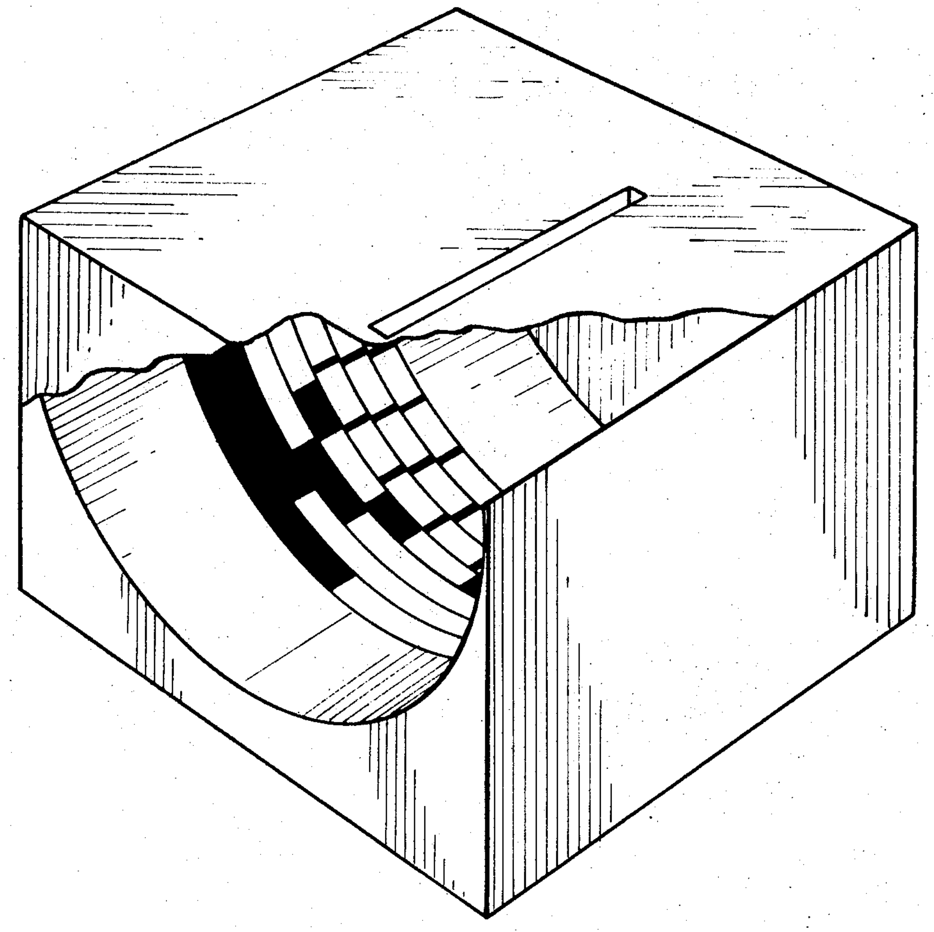
FIG. 6 is a cutaway isometric view of a third embodiment of the present invention.

Nonlinearity errors may be entirely eliminated by use of a semicircular encoder mask as shown in FIG. 6 so that all angular positions are equi-distant from the aperture. The only limitation then existing would be a variation of the image width with sun angle. This limitation may be overcome by use of a cylindrical lens mounted in aperture 3. The cylindrical lens eliminates any refraction problems and maintains a constant image width.

The nonlinearity errors can be compensated for by making the clear and opaque segments of each track increasingly longer as the angular position increases in both the positive and negative directions. Each segment should be increased by a factor of $(1/\cos^2\phi)$ where $\phi$ is the sun angle to achieve this compensation.

It is to be understood that the opaque and clear segments can be interchanged without varying from the disclosed invention, likewise the positions of the tracks can be interchanged. The tracks may all be displaced a like amount to provide a bias for the digital output so that it reads out the sun angle plus some constant.

The present invention is also applicable to brush type encoders where a resolution limiting factor is brush width. By using photographic techniques conductive portions of encoder masks can be made extremely fine; however, there are practical limitations preventing the construction of a fine brush. The inventive concepts of the present invention can be applied to an encoding device using brushes and an encoder mask having alternate conductive and nonconductive portions. The brushes are the equivalent of the image and have a finite width K. The encoder mask is designed in accordance with the invention so that fine resolutions of less than a brush width may be obtained.

The present invention may be utilized to measure sun angles of up to $\pm$ 90° with any desired resolution. The sun sensor is relatively simple compared to those of the prior art and provides sub-image resolution while providing a very useful Gray Code output that may be used with existing decoders.

What is claimed is:

1. A sun sensor, comprising:

a plurality of light responsive means;

an encoder mask having a plurality of tracks associated with the light responsive means and having opaque and clear segments;

means for receiving sunlight and forming a band of light having a width K across the tracks on the encoder mask, the position of the band on the tracks corresponding to the angle of the sun relative to the sensor, the opaque and clear segments being formed and arranged to block or pass light to the associated light responsive means so that the light responsive means provides a digital output that is coded to sense a displacement of the band to a resolution better than width K and corresponding to the angular position of the sun relative to the sensor;

the sun sensor including means for combining bits of the coded digital output to provide a Gray Coded output having the same resolution with fewer bits.

2. A sun sensor as described in claim 1, wherein the encoder mask comprises:

a plurality of interpolating tracks numbering $n-1$ for providing interpolating bits having a resolution of $K/n$ where $n$ is a whole number, the interpolating tracks have clear segments that repeat at 2 K intervals and have a length equal to $K/n$, the track providing the least significant bit having the first clear segment starting at a distance K/2 from a zero angle position and the remaining tracks are displaced by an amount $K/n$ from the track providing the next lower significant bit in a direction of increasing angular position; and a plurality of coded tracks each having clear segments that repeat at $(2^{m+1})$ K intervals and have a length equal to $[2^m-1+(1/n)]$ K where $m$ is the number of the track counting from the least to the most significant coded track, the first clear segment starting at a distance $[2^{m-1}+(1/n)]$ K from the zero angle position.

3. A sun sensor as described in claim 2, wherein the clear and opaque segments of the tracks are interchanged.

4. A sun sensor as described in claim 2, wherein each track has additional clear and opaque segments formed and arranged so that each track is symmetrical about the zero angle position whereby the sensor measures both positive and negative angles.

5. A sun sensor as described in claim 4, additionally comprising means for providing a signal corresponding to the sense of the sun angle.

6. A sun sensor as described in claim 4, wherein the encoder mask additionally comprises:

a non-symmetrical track having segment starting at a distance K/2 from a zero angle position and extending to the maximum angle position; and a light responsive means associated with said track for providing a signal corresponding to the sense of the sun angle.

7. A sun sensor as described in claim 4, wherein the opaque and clear segments are increased in length by a factor $(1/\cos^2\phi)$ where $\phi$ is the angular position of the segment.

8. A sun sensor as described in claim 4, wherein the tracks are displaced to provide a bias for the digital output.

9. A sun sensor as described in claim 1, wherein the encoder mask comprises:

a plurality of interpolating tracks number $2^n-1$ for providing interpolating bits having a resolution of $(K/2)n$ where $n$ is a whole number, the tracks have clear segments that repeat at 2 K intervals and have length of K/2n, the track providing the least significant bit has the first clear segment starting at the distance K/2 from a zero angle position and the remaining tracks are displaced $(K/2)n$ from the track providing the next lower significant bit in a direction of increasing angular position; and a plurality of coded tracks each having clear segments that repeat at $(2^{m+1})$ K intervals and have a length equal to $[2^m-1+(1/2)n]$ K where $m$ is the number of the track counting from the least to the most significant coded track, the first clear segment of each track starting at a distance $[2^{m-1}+(1/2)n]$ K from the zero angle position.

10. A sun sensor as described in claim 9, additionally comprising circuit means for combining bits of the coded digital output to provide a Gray Coded output having the same resolution with fewer bits.

11. A sun sensor as described in claim 9, additionally comprising circuit means for combining certain of the interpolating bits to provide Gray Code bits so that the $2^n-1$ interpolating bits are reduced to a Gray Code bits.

12. The sun sensor as described in claim 11, wherein bit number p of the n Gray Code bits is a combination of interpolating bits $2^{p-1}$ and multiples thereof excluding bits that are multiples of $2^p$, where p is the number of the Gray Coded bit counting from the least to the most significant bit and the interpolating bits are numbered from least to most significant.

13. A sun sensor as described in claim 12, wherein the means for combining certain of the interpolating bits includes means for adding the one level bits of the coded bits that are to be combined and for providing a Gray Code one level bit if the sum is zero or an even number and a zero level if the sum is an odd number.

14. A sun sensor as described in claim 11, wherein the means for combining certain of the interpolating bits includes, a plurality of circuits each comprising:

an OR gate having two inputs for receiving two of the bits to be combined and having an output for providing a one level signal if either or both inputs receive a one level signal;

a NAND gate, having two inputs for receiving the same two bits and having an output for providing a zero level signal when both inputs receive one level signals; and an AND gate, having two inputs, connected to the outputs of the OR gate and NAND gate and responsive to the signals therefrom for providing a one level signal when both inputs receive one level signals, whereby the AND gate provides a zero level signal when the two bits to be combined are both of the same level and provides a one level signal when the bits to be combined are of different levels.

15. A sun sensor as described in claim 9, wherein the clear and opaque segments of the track are interchanged.

16. A sun sensor as described in claim 9, wherein each track has additional clear and opaque segments formed and arranged so that each track is symmetrical about the zero angle position whereby the sensor measures both positive and negative angles.

17. A sun sensor as described in claim 16, additionally comprising means for providing a signal corresponding to the sense of the sun angle.

18. A sun sensor as described in claim 17, additionally comprising circuit means for combining bits of the coded digital output to provide a Gray Coded output having the same resolution with fewer bits.

19. A sun sensor as described in claim 17, additionally comprising circuit means for combining certain of the interpolating bits to provide Gray Code bits so that the $2^{n-1}$interpolating bits are reduced to $n$ Gray Code bits. n⁻

20. A sun sensor as described in claim 16, wherein the opaque and clear segments are increased in length by a factor $1/(\cos^2\phi)$ where $\phi$ is the angular position of the segment.

21. A sun sensor as described in claim 16, wherein the tracks are displaced to provide a bias for the digital output.

22. A sun sensor as described in claim 16, wherein the encoder mask additionally comprises:

- a non-symmetrical track having a segment starting at a distance K/2 from a zero angle position and extending to the maximum angle position; and
- a light responsive means associated with said track for providing a signal corresponding to the sense of the sun angle.

23. A sun sensor as described in claim 9, wherein the opaque and clear segments are increased in length by a factor $1/(\cos^2\phi)$ where $\phi$ is the angular position of the segment.

24. A sun sensor as described in claim 9, wherein the tracks are displaced to provide a bias for the digital output.

25. A sun sensor as described in claim 2, wherein the opaque and clear segments are increased in length by a factor of $1/(\cos^2\phi)$ where $\phi$ is the angular position of the segment.

26. A sun sensor as described in claim 1, wherein the encoder mask is formed in two planes intersecting at an angle forming a line across to the tracks.

27. A sun sensor as described in claim 1, wherein the encoder mask is curved so that all points thereon are equi-distant from the means for receiving sunlight.

28. A sun sensor as described in claim 1, wherein each light responsive means includes a threshold trigger.

* * * * *